United States Patent
Kim

(10) Patent No.: US 7,925,282 B2
(45) Date of Patent: *Apr. 12, 2011

(54) SYSTEM AND METHOD FOR STORING SMS MESSAGES IN A MOBILE COMMUNICATIONS TERMINAL

(75) Inventor: Hyun-Sung Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 2143 days.

This patent is subject to a terminal disclaimer.

(21) Appl. No.: 10/443,133

(22) Filed: May 22, 2003

(65) Prior Publication Data

US 2004/0235502 A1 Nov. 25, 2004

(30) Foreign Application Priority Data

May 24, 2002 (KR) .................. 10-2002-0029010

(51) Int. Cl.
H04W 4/00 (2009.01)
H04M 1/725 (2006.01)
H04B 1/38 (2006.01)

(52) U.S. Cl. .............. 455/466; 455/412.1; 455/558

(58) Field of Classification Search .......... 455/466, 455/412.1, 550.1, 558
See application file for complete search history.

(56) References Cited

U.S. PATENT DOCUMENTS

| 5,687,216 A * | 11/1997 | Svensson | 455/412.2 |
| 6,014,561 A | 1/2000 | Mölne | 455/419 |
| 2001/0049279 A1 * | 12/2001 | Vermelle et al. | 455/419 |
| 2004/0048627 A1 * | 3/2004 | Olvera-Hernandez | 455/466 |
| 2005/0083755 A1 * | 4/2005 | Choi | 365/222 |

FOREIGN PATENT DOCUMENTS

| EP | 0562890 A1 | 9/1993 |
| JP | 2002-359160 | 12/2002 |
| JP | 2004-505525 | 2/2004 |
| WO | WO 9430023 A1 | 12/1994 |
| WO | WO 97/23104 | 6/1997 |
| WO | WO 00/31997 | 6/2000 |
| WO | WO02/09460 A1 | 1/2002 |
| WO | WO 02/23870 | 3/2002 |
| WO | WO 02/25976 A1 | 3/2002 |

OTHER PUBLICATIONS

Digital Cellular Telecommunications System (Phase 2+); Alphabets and Language-Specific Information (GSM 03.38 Versiion 7.2.0 Release 1998), ETSI TS 100 900 v7.2.0. (Jul. 1999).

Digital cellular telecommunications system (Phase 2+); Alphabets and language-specific information (GSM 03.38 version) Jul. 1999; pp. 1-20, part 4, pp. 6-8; ETSI; France.

* cited by examiner

*Primary Examiner* — George Eng
*Assistant Examiner* — Marcos L Torres
(74) *Attorney, Agent, or Firm* — Ked & Associates LLP

(57) ABSTRACT

A method for storing short message service (SMS) messages in a mobile communication terminal includes determining that a storing region corresponding to a Class of a new SMS message is full by detecting a transferable SMS message in the pertinent storing region, transferring the detected SMS message to another storing region, and storing the new SMS message in the pertinent storing region.

20 Claims, 3 Drawing Sheets

SYSTEM AND METHOD FOR STORING SMS MESSAGES IN A MOBILE COMMUNICATIONS TERMINAL

BACKGROUND OF THE INVENTION

1. Field of the Invention

The present invention generally relates to a global system for mobile communication (GSM) terminal, and in particular to a system and method for storing short message service (SMS) messages in a GSM terminal.

2. Background of the Related Art

With the rapid popularization of mobile communications, usage of mobile communication terminals has greatly increased in comparison with usage of standard telephones in the home or office. A mobile communication terminal is a handheld device capable of wirelessly transmitting/receiving voice, character and/or picture information. These terminals not only perform general voice communication services but also various message transmission services and are generally classified as either a GSM (global system for mobile communication) terminal or a CDMA (code division multiple access) terminal.

A GSM terminal operates according to the European standard based on time division multiple access (DMA) techniques. More specifically, GSM terminals use a subscriber identity module (SIM) card to identify and authenticate a subscriber. The SIM card is a smart card which removably attaches to the GSM terminal and consists of a microprocessor and a memory. The memory stores personal information (e.g., authentication information) of an owner as well as information (e.g., telephone number and network number) for operating the terminal and SMS messages. A user can receive a request communication service after a SIM card is installed in a GSM terminal which supports a SIM interface and after passing a user authentication process.

FIG. 1 is a block diagram illustrating a general GSM (global system for mobile communication) system. This system includes GSM terminals 100-1, 100-2, a mobile switching center (SC) 110, and a SMS service center (SMSC) 120 connected to the MSC 110 in order to relay SMS messages between the GSM terminals 100-1, 100-2. The GSM terminals communicate with the MSC through base station subsystem 130-1, 130-2 respectively, and the SMSC 120 is connected to the MSC through a SMS gateway. The base station subsystems 130-1, 130-2 respectively include a base station controller (BSC) and plural base stations (BSs).

As shown in FIG. 2, each GSM terminal 100-1, 100-2 includes a SIM card 200 and ME (mobile equipment) 201, and is connected to external terminal equipment TE) 202 such as a workstation and a serial PC through an I/O connector 50. The ME 201 is a part separate from the SIM 200. The GSM terminal is constructed by combining the ME and SIM card 200 into the terminal. The ME also includes an internal memory which stores short messages and various information.

One method for storing short messages in a GSM terminal as previously described will now be discussed. Initially, an SMS message written in the GSM terminal 100-1 is transmitted to the SMSC 120 through the base station subsystem 130-1 and the MSC 110. The SMSC 120 discriminates a called number and transmits the received SMS message to the GSM terminal 100-2 through the MSC 110 and the base station subsystem 130-2. In transmitting the SMS message, the SMSC 120 transmits Class information for designating a position for storing a pertinent SMS message. The Class information may be Classified as one of four types:

1) Class 0: Display only
2) Class 1: Store a SMS message in the ME (internal memory of the terminal)
3) Class 2: Store the SMS message in the SIM card
4) Class 3: Store the SMS message in the TE Class 0 information is transmitted for only displaying the SMS message. Class 1 information is transmitted for storing the SMS in the ME 201. Class 2 information is transmitted for storing the SMS in the SIM card 200. And, Class 3 information is transmitted for storing the SMS message in the external TE 202. The SMSC 120 can transmit SMS messages without designating SMS Class information.

When the SMS message is received from the SMSC 120, the GSM terminal 100-2 checks whether there is Class information in the received SMS message. When Class information is in the received message, the SMS message is displayed or is stored in one of the SIM card 200, the ME 201 and the TE 202 by referring to the pertinent Class information.

When no Class information is in the received SMS message, the GSM terminal stores the SMS message according to a preset storing priority order. For example, the GMS terminal 100-2 stores the received SMS message in the SIM card 200 first, or, the GSM terminal 100-2 stores the SMS message in the ME 201 only when a message storage of the SIM card 200 is full.

As previously described, when the SMSC does not transmit Class information, the GSM terminal stores the received message in the SIM card first according to the preset storing priority order. However, when the storage of the SIM card is full and an SMS message having Class 2 is received, the GSM terminal can no longer receive the Class 2 type SMS message even though there is sufficient storage space in the internal memory of the ME. In addition, when the internal memory of the ME is full, the GSM terminal cannot receive the SMS message if a SMS message designated in Class 1 is received.

In order to solve the above-mentioned problem, the terminal user is forced to check SMS messages stored in the terminal and delete unnecessary messages, which results in significant inconvenience to the user.

Thus, in the conventional method for storing SMS messages in a GSM terminal, it is impossible to store SMS message efficiently in a request storing region based on SMS Class, and accordingly reliability of the SMS service may be lowered due to the message reception rate lowering problem.

SUMMARY OF THE INVENTION

An object of the invention is to solve at least the above problems and/or disadvantages and to provide at least the advantages described hereinafter.

An object of the present invention is to provide a system and method for storing SMS messages in a mobile communications terminal efficiently within a message storing region based on SMS Class. The terminal is preferably but no limited to a GSM-type terminal.

Another object of the present invention to provide a system and method for storing SMS messages in a GSM terminal which improves an SMS message reception rate.

Another object of the present invention to provide a system and method for storing SMS messages in a GSM terminal which stores a Class 2-type SMS message efficiently when a storing region of a SIM card is full.

Another object of the present invention to provide a system and method for storing SMS messages in a GSM terminal which guarantees reliability of an SMS service.

In order to achieve these and other objects and advantages, a system and method for storing SMS messages in a mobile terminal includes receiving a SMS message; checking whether an empty region exists in a first storing region; transferring a certain SMS message stored in the first storing region to a second storing region when the empty region does not exist; and storing the received SMS message in the first storing region. The first storing region is preferably a SIM and the second storing region is preferably an internal memory of a ME. Moreover, the class of the first SMS message is preferably Class 1 or Class 2, although other classes are possible if desired. The terminal may be a GSM terminal or another type of terminal.

The first storing region may be an internal memory of a ME, and the second storing region may be an internal memory of a TE. The certain SMS message is Class not given SMS message.

In order to achieve the above-mentioned object, a SMS message storing method of a GSM terminal includes detecting SMS Class of a received first message; checking whether there is an empty region in a first storing region corresponded to the detected SMS Class; detecting a transferable second message in the first storing region when there is no empty region in the first storing region; and transferring the detected second message to a second storing region and storing the first message in the first storing region. The method further includes displaying the received SMS message without storing it when the detected SMS Class is 0 or 3.

The first storing region is an internal memory of a ME, and the second storing region is an internal memory of a TE when the detected SMS Class is 1. The first storing region is a SIM, and the second storing region is an internal memory of a ME when the detected SMS Class is 2. The second SMS message is Class not given SMS message.

In order to achieve the above-mentioned object, a SMS message storing method of a GSM terminal includes checking whether there is an empty storing region in a SIM when a first message is received; checking whether SMS Class of the first message is 2 when there is no empty storing region in the SIM; checking whether there is a transferable second message in the SIM when SMS Class of the first message is 2; transferring the second message to a ME (mobile equipment) when there is the transferable second message; and storing the first message in the SIM. The first and second messages are SMS messages, and the second message is Class not given SMS message. The method further includes rejecting reception of the first message when both empty storing region and a second message do not exist in the SIM.

Additional advantages, objects, and features of the invention will be set forth in part in the description which follows and in part will become apparent to those having ordinary skill in the art upon examination of the following or may be learned from practice of, the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Because a storing position of a received SMS message is determined according to an SMS Class thereof, a message reception rate is determined according to utilization capacity and a size of a memory. In accordance with the present invention, by transferring a certain SMS message stored in a subscriber identity module (SIM) card and an internal memory of a mobile equipment (ME) into another region, a memory can be used efficiently. Accordingly, it is possible to improve the SMS message reception rate. In accordance with at least one embodiment, the SMS message transferring is performed based on SMS Class.

Figure 1:
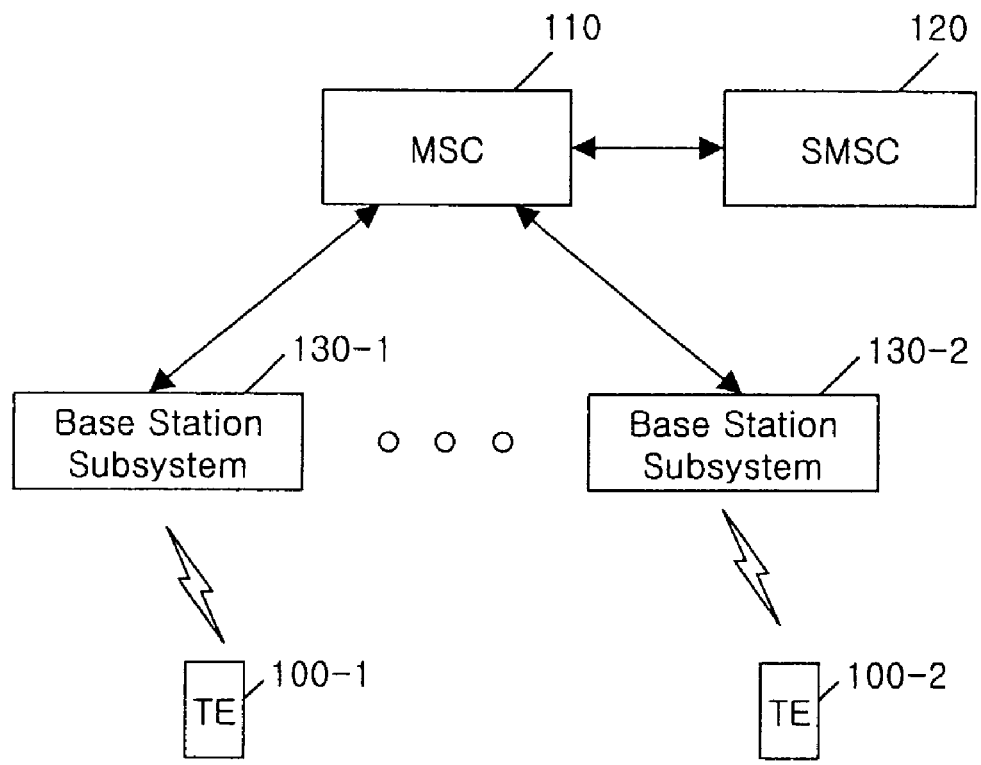
FIG. 1 is a block diagram illustrating a related-art global system for mobile communication (GSM) system.
Figure 2:
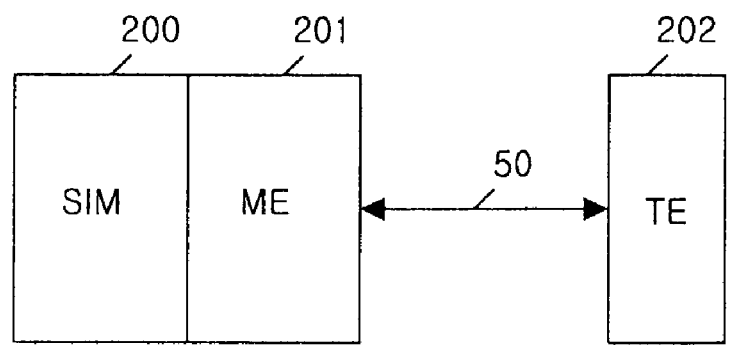
FIG. 2 illustrates a connection relation among a SIM, a ME and a TE of the related-art GSM system in FIG. 1.
Figure 3:
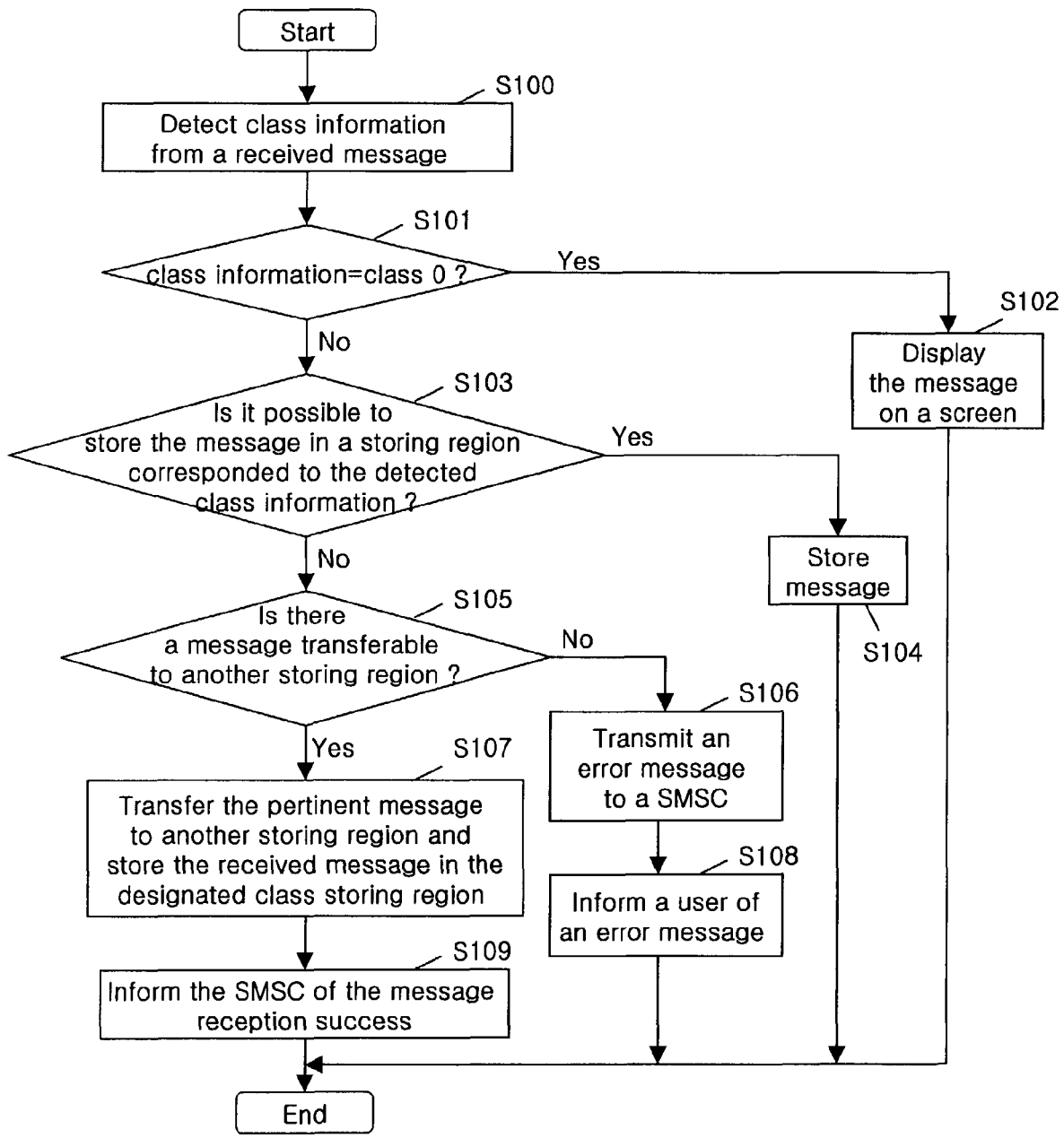
FIG. 3 is a flow chart illustrating a method for storing a short message service (SMS) message in a mobile communications (e.g., GSM) terminal in accordance with a first embodiment of the present invention.

FIG. 3 is a flow chart showing steps included in a method for storing SMS messages in a mobile communications terminal in accordance with a first embodiment of the present invention. The terminal may be, but is not limited to, a GSM terminal. The GSM-embodiment may be implemented in a system such as shown in FIG. 1. For convenience, it may be assumed that an SMS message is transmitted from a GSM terminal 100-2 to a GSM terminal 100-1.

When the SMS message is received from the SMSC 120, the GSM terminal 100-1 detects Class information in a set with the SMS message and judges whether the detected Class information is 'Class 0' as shown at steps S100 and S101.

In the judging result, when the detected Class information is 'Class 0', the GSM terminal 100-1 displays the pertinent SMS message on a screen as shown at step S102. When the detected Class information is not 'Class 0' (Class 1 or Class 2), the GSM terminal 100-1 checks a state of a storing region corresponding to the detected Class information. Preferably, the storing region is one of the SIM card or the ME.

If it is not possible to store the SMS message in the storing region, and more specifically, when an empty region does not exist, the GSM terminal 100-1 checks whether there is a transferable message, for example, a class not given message exists as shown at step S104.

In the checking result, when the transferable message does not exist, the GSM terminal 100-1 transmits a reception error message indicating a reception reject to the SMSC 120 and informs a user of the message reception error.

When the transferable message exists, the GSM terminal 100-1 generates an empty region by transferring the Class not given message to another storing region and stores the new SMS message in the empty region. Preferably, the SMS message can be transferred from the SIM card to the ME or from the ME to the TE.

When the SMS message storing is finished, the GSM terminal 100-1 transmits a signal for informing a reception success to the SMSC 120. Afterward, when a new SMS message is received again, the SMS message is stored in the SIM and the ME through the above-described process.

As described above, the first embodiment of the present invention can be applied to a case of receiving a SMS message through a certain application when the GSM terminal 100-1 is connected to the external terminal equipment (TE) 202 through an I/O connector thereof.

Figure 4:
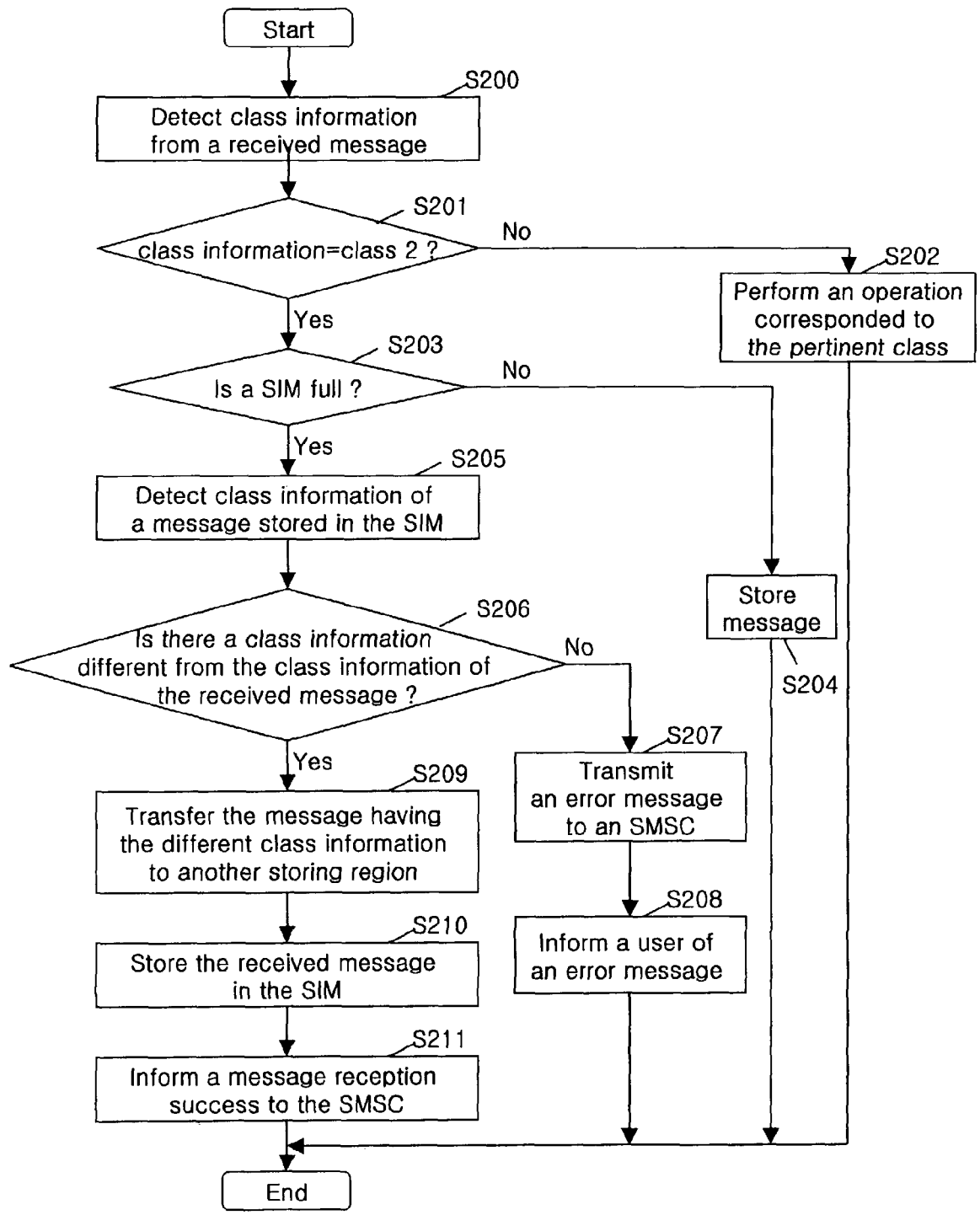
FIG. 4 is a flow chart illustrating a method for storing an SMS message in a mobile communication (e.g., GSM) terminal in accordance with a second embodiment of the present invention.

FIG. 4 is a flow chart showing steps included in a method for storing an SMS message in a mobile communication terminal in accordance with a second embodiment of the present invention. The second embodiment can be applied when the terminal is not connected to the TE 200. Like with the first embodiment, the terminal may be a GSM-type terminal, however, other types may be used if desired.

When an SMS message is received, the GSM terminal 100-1 detects Class information of the SMS message and judges whether the detected Class information is Class 2 as shown at steps S200 and S201.

In the judging result, when the detected Class information is not Class 2, the GSM terminal 100-1 performs a storing operation corresponding to each Class as shown at step S202. When the detected Class information is Class 2, the GSM terminal 100-1 checks whether the storing region of the SIM card is full as shown at step S203. The process order (S200~S203) may be varied as occasion demands. For example, Step S203 may be performed first, and steps S200, S201 may be performed later. These steps may be performed in a different order if desired.

When the storing region of the SIM card is not full, the new SMS message is stored in the SIM card as shown at step S204. When the storing region of the SIM card is full, Class information of the SMS message stored in the SIM card is detected as shown at step S205. Then, it is checked whether an SMS message having Class information different from Class 2, e.g., whether a Class not given message exists as shown at step S206.

If there is a no Class not given message in the SIM card, and more specifically, if only Class 2-type SMS messages are stored in the SIM card, the GSM terminal 100-1 transmits a reception error signal for indicating a new SMS message reception impossible state to the SMSC 120 and informs the user of the message reception error as shown at steps S207 and S208.

If a Class not given message exists in the SIM card, the GSM terminal 100-1 transfers the Class not given message from the SIM card to the ME and stores the received new SMS message in the SIM card as shown at steps S209 and S210. And, when the new message storing is finished, the GSM terminal 100-1 transmits a message reception success signal as shown at step S211. The SMS message storing method has been described thus far with respect to operations performed the GSM terminal 100-1. However, these same operations may be performed in the GSM terminal 100-2.

The present invention, thus, offers at least the following advantages. In a GSM terminal which sets a storing region according to SMS Class, when a storing space of a SMS message corresponding to each SMS Class is insufficient, by transferring a SMS message having different Class information in a pertinent storing region to another storing region, a new SMS message can be stored in the pertinent storing region. Accordingly, it is possible to store a received SMS message in a storing region corresponding to Class information and at the same time improve usage efficiency of SMS storing region. Accordingly, an SMS message reception rate is substantially improved. In addition, by preventing an SMS message reception error from occurring due to an SMS message storing region shortage, usage reliability of the terminal can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for storing messages in a mobile communication terminal, comprising:
   receiving a first SMS message having class information indicative of a first storing region;
   checking whether an empty region exists in the first storing region based on the class information in the first message;
   if an empty region does not exist, determining whether the first storing region includes a second SMS message having class information that is not indicative of the first storing region;
   if the second SMS message exists, transferring the second SMS message from the first storing region to a second storing region; and
   storing the first SMS message in the first storing region.

2. The method of claim 1, wherein the first storing region is a subscriber identity module (SIM), and the second storing region is an internal memory of a mobile equipment (ME).

3. The method of claim 1, wherein a Class of the received first SMS message is Class 2.

4. The method of claim 1, wherein the class information in the second SMS message is indicative of a different storing region of the terminal, wherein said different storing region corresponds to the second storing region or another storing region.

5. The method of claim 1, wherein the second SMS message is Class not given SMS message.

6. The method of claim 1, wherein the first storing region is an internal memory of a ME (mobile equipment), and the second storing region is an internal memory of a TE (terminal equipment).

7. The method of claim 1, wherein Class of the received first SMS message is Class 1.

8. A method for storing messages in a mobile communication terminal, comprising:
   detecting a Class of a received first message;
   checking whether there is an empty region in a first storing region corresponding to the detected Class;
   detecting a transferable second message in the first storing region when there is no empty region in the first storing region, the transferable second message including Class information that is not indicative of the first storing region; and
   transferring the detected second message to a second storing region based on the Class information in the transferable second message and storing the first message in the first storing region.

9. The method of claim 8, wherein the first and second messages are SMS messages.

10. The method of claim 8, further comprising:
    displaying the received first message without storing it when the detected Class is a first class or a second class.

11. The method of claim 10, wherein the first message and second message are SMS messages.

12. The method of claim 11, wherein the first class and the second class are SMS Class 0 and SMS Class 3, respectively.

13. The method of claim 9, wherein the first storing region is an internal memory of a mobile equipment (ME), and the second storing region is an internal memory of a terminal equipment (TE) when the detected SMS Class is 1.

14. The method of claim 9, wherein the first storing region is a subscriber identity module (SIM), and the second storing region is an internal memory of a ME when the detected SMS Class is 2.

15. The method of claim 9, wherein the second message is a Class not given SMS message.

16. The method of claim 9, further comprising:
rejecting reception of the first message when both empty storing region and a second message do not exist in the first storing region.

17. A method for storing messages in a mobile communication terminal, comprising:
checking whether there is an empty storing region in a subscriber identity module (SIM) when a first message is received;
checking whether a Class of the first message is a first class;
checking whether there is a transferable second message in the SIM based on class information of the second message when the Class of the first message is said first class;
transferring the second message to a mobile equipment (ME) when there is the transferable second message; and
storing the first message in the SIM.

18. The method of claim 17, wherein the first and second messages are SMS messages.

19. The method of claim 18, wherein the second message is Class not given SMS message.

20. The method of claim 17, further comprising:
rejecting reception of the first message when both empty storing region and a second message do not exist in the SIM.

\* \* \* \* \*